(No Model.)
W. H. WRIGHT.
THILL COUPLING.
No. 298,810. Patented May 20, 1884.
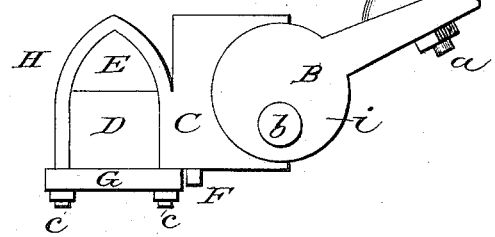
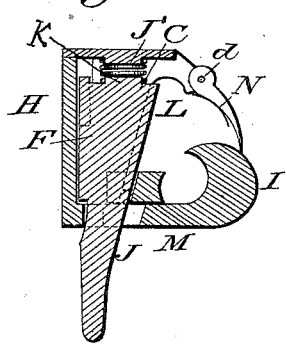
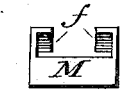
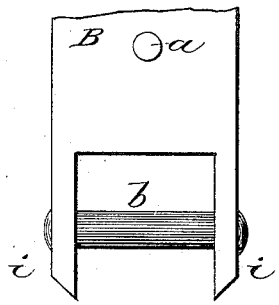
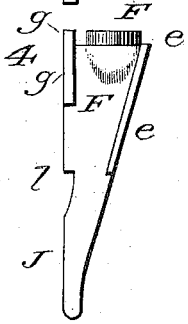
Witnesses:
J. Wilson Luckey
Henry B. Crossett
Inventor:
W. H. Wright

UNITED STATES PATENT OFFICE.

WILLIAM H. WRIGHT, OF TARRYTOWN, NEW YORK.

THILL-COUPLING.

SPECIFICATION forming part of Letters Patent No. 298,810, dated May 20, 1884.

Application filed June 7, 1883. (No model.)

*To all whom it may concern:*

Be it known that I, WILLIAM H. WRIGHT, a citizen of the United States, residing at Tarrytown, in the county of Westchester and State of New York, have invented a new and useful Safety Shaft-Coupling for Carriages, of which the following is a full, clear, and exact description, reference being had to the accompanying drawings, where like letters refer to like parts throughout the several figures.

My invention relates to improvements in connecting the shafts of carriages or traction vehicles to the axles, so as to combine the advantages of security, rigidity, simplicity, rapidity of adjustment, and silent action.

In the accompanying drawings, Figure 1 is a diagram, in which the shaft A appears permanently attached by bolts or nuts $a$ $a$ to a stub, B, carrying a permanent coupling-pin set into two side pieces, $i$ $i$, whose cheeks extend sufficiently to completely cover all openings in the sides of the housing, and also, with the body of the housing, constitute a tight housing inclosing the interior working-clamp, cam, and spring when the pin $b$ is in its socket behind the draw-hook I, thereby excluding all dust, dirt, water, and ice from contact with such working parts, but permitting the free axial movement of the coupling-pin. D represents the portion of the axle upon which is the housing C, containing coupling devices, the whole attached by means of the clip H, binding the bed-piece E to the clip-bar G by bolts and nuts $c$ $c$.

Fig. 2 is a plan of the stub B, showing the coupling-pin $b$, the side cheeks, $i$ $i$, and one of the holes for attaching it to the end of the shaft A by means of bolts or nuts $a$ $a$.

Fig. 3 is a vertical section of the housing C and its contents for holding or releasing the coupling-pin $b$. I is a drawing-hook formed on the lower part of the housing, which, extending forward from the housing and upward, is recurved upon itself to form a socket to receive the coupling-pin $b$. The housing on its superior part projects forward and over the socket, and carries a hinged joint with a pivot, $d$, upon which the spring-trap K moves. Within the housing is the cam F, with its forward guides or ways and its rear guides or ways, its boss pressed by a vertical spring set into the housing and its foot protruding and working through a space or slot in the under side of the housing, provided with a rest, such cam working in guides or ways vertically and engaging in and operating in its ascent and descent the clamp M, restricted to a horizontal motion, also provided with diagonal guides or ways, which shall permit the vertical movement of the cam, and by their engagement with the cam therein correspondingly communicate a horizontal motion to the clamp. The details of such cam, clamp, guides or ways are shown in subsequent figures.

Fig. 4 is a diagram of such cam F furnished with its front guides or ways, $e$ $e$, which operate the sliding clamp M and cause it to advance or recede from the coupling-pin, according as such cam descends or ascends, and maintaining a constant pressure upon the clamp and keeping it in contact with the coupling-pin, when the clamp presses against the coupling-pin. A space is left open in the bottom of the housing for the descent of the foot of the cam, so as to secure the automatic advance of the clamp to any extent which may be required to fit any size of coupling-pin or to compensate for the wear of the parts and of the coupling-pin. The size of such opening is only sufficient to admit, and conforms to that section of the cam which limits the extent of its intended descent.

Fig. 5 is a plan or top view of the end of the cam F, showing the guides or ways $e$ $e$ $g$ $g$ and the boss K. The rear guides or ways serve to maintain the cam in a vertical direction. The rest $l$ is formed near the top of the foot $j$, so as to allow of the cam being pressed back and caught upon the inside of the housing, so as to retain the cam when raised and the clamp back from the socket. The lug or guide which regulates the vertical movements of the cam is placed near its boss, and is of such length and bevel as to permit the foot to be slipped off its rest and to descend into the bottom opening without disengaging such lug from its corresponding way. Such way should be of the length of the vertical movement to which the cam is to be subjected. The lug or guide which operates upon the forward part of the cam to engage with the clamp and to give to it an advancing or retrograde horizontal motion should be longer than the vertical thickness of such clamp, so as not to disengage from its corresponding way when such cam is raised or depressed to its fullest extent. The clamp slides horizontally upon the bottom of the housing in a way provided for it, recessed in the inner sides of the housing, and corresponding in height or vertical thickness.

Fig. 6 is a plan or top view of such clamp M, showing its guides or ways $f\ f$, in which the cam F slides upward and downward.

The trap N, Fig. 3, is hinged to the housing-body C, and carries on its under side a spring, extending so as to press against the under side of the fixed part of the hinge, sometimes called the "butt." The part of the butt upon which the spring moves has its greatest thickness at the point where such spring finds its bearing when such trap is intermediate between, being fully open or fully closed, thereby tending to prevent it from remaining at rest when partly open. The trap closes smoothly upon the top of the draw-hook. It performs no function of retaining the coupling-pin, but simply covers the opening whence the coupling-pin may be attached or detached, while as a part of the housing, when closed, it effectually excludes foreign substances.

It will be observed that what I designate as the "housing" consists of an inclosing body attached to the axle, and of adjustable parts, as the trap and cheeks, when in place. The body and the parts may be struck out of suitable metal by means of proper dies, so that the interior shall present surfaces adapted to the guides or ways of the working parts. The clamp and cam are properly engaged and placed, and pressure exerted by folding apparatus, so that the housing is brought together over them, so that they cannot be subsequently removed without destroying the housing. The spring operating the cam may subsequently be inserted in place, as it is capable of removal or renewal, if necessary. The hook is pressed into shape by the same or similar folding operation, the shape of the body near its sides being formed to admit of a coupling-pin passing into the socket formed by such draw-hook.

The function of the drawing-hook I is to retain the coupling-pin $b$. Its inner curve is intended, as far as possible, to correspond with the surface of such pin, so as to avoid unequal bearing or local friction, and so as to hold it against any force exerted upon it except backward and upward about forty-five degrees from a vertical line. When the coupling-pin is in position the clamp holds it firmly in place, allowing only an axial motion. The surface of the clamp which holds the coupling-pin also conforms to the surface of the pin, so that when coupled all motion except an axial motion is impossible, and no dirt or grit can enter the bearing. The peculiar features of the clamp are that it cannot become disengaged from the bottom, nor from its cam, either by accident or design, and in any horizontal position it finds a stable support against the cam, which maintains constant pressure upon and contact with the coupling-pin, whatever may be its diameter or the wear to which the different surfaces may be subjected. Another is that it is so engaged with the cam that as the latter moves in a vertical direction it correspondingly moves in a horizontal direction, and cannot move at all without such movement of the cam. The cam differs from any wedge-shaped cam heretofore used in thill-couplings in being inseparable from the housing and the clamp, and in being provided with lugs, guides, or ways, maintaining it constantly in a vertical position, yet allowing sufficient play for the lodgment and dislodgment of the rest, without disengaging such cam from the clamp or from its own vertical ways or guides, irrespective of the position into which such cam might be forced; also, in being provided with front or diagonal guides or ways engaging in and operating horizontally the clamp aforesaid, as it is itself moved in a vertical direction; also, in being provided with a rest and a foot extending through the bottom of the housing, whereby by pressing such foot from without the clamp may be withdrawn from the coupling-pin without withdrawing any of the working parts from their relative positions or removing any of them from the housing; also, in being provided with a spring susceptible of removal or renewal, transmitting constant pressure to the clamp by means of its vertical action upon the boss of the cam.

To uncouple the pin, the foot J of the cam F, which extends through the under surface of the housing, is raised and thrust backward until the rest $l$ is lodged upon the inner surface or ledge provided for it in the bottom of the housing. This action has compressed the spring J' at the boss of the cam, and the raised cam has slid the clamp back from the coupling-pin. By taking hold of the shaft A it may be pushed backward and upward to clear the draw-hook I, when the trap N will open, and the pin be uncoupled. The foot of the cam may be dislodged from its rest, and the spring causes it to descend in place.

To couple the pin the trap must be raised and the pin placed in the socket of the draw-hook after having raised the foot of the cam sufficiently to slide back the clamp. When the pin is in position, the clamp slides into place by the action of the cam forced downward by its spring. The trap is closed by hand.

The advantages of my invention are that the socket and the coupling-pin are quickly adjusted, easily lubricated, and perfectly noiseless, while the coupler is not liable to derangement from accident, shock, wear, heat, or friction. The important working parts, being inseparable from the housing, are not liable to be lost, and are protected from external injury or accidental displacement. They need no attention except an occasional oiling, as all dust, dirt, water, or ice are effectually excluded. The whole device is quite as compact as an ordinary coupling, and as easily attached to an axle.

What I claim as my invention, and which I desire to secure by Letters Patent, is—

In a thill-coupling, the combination of a fixed housing, C, draw-hook I, depressing vertical spring, and vertical cam F inseparably engaged in and operating the restricted horizontal-acting clamp M backward and forward, substantially in the manner and for the purposes described.

WILLIAM H. WRIGHT.

Witnesses:
JOHN A. SOULE,
A. S. CUSHMAN.